UNITED STATES PATENT OFFICE.

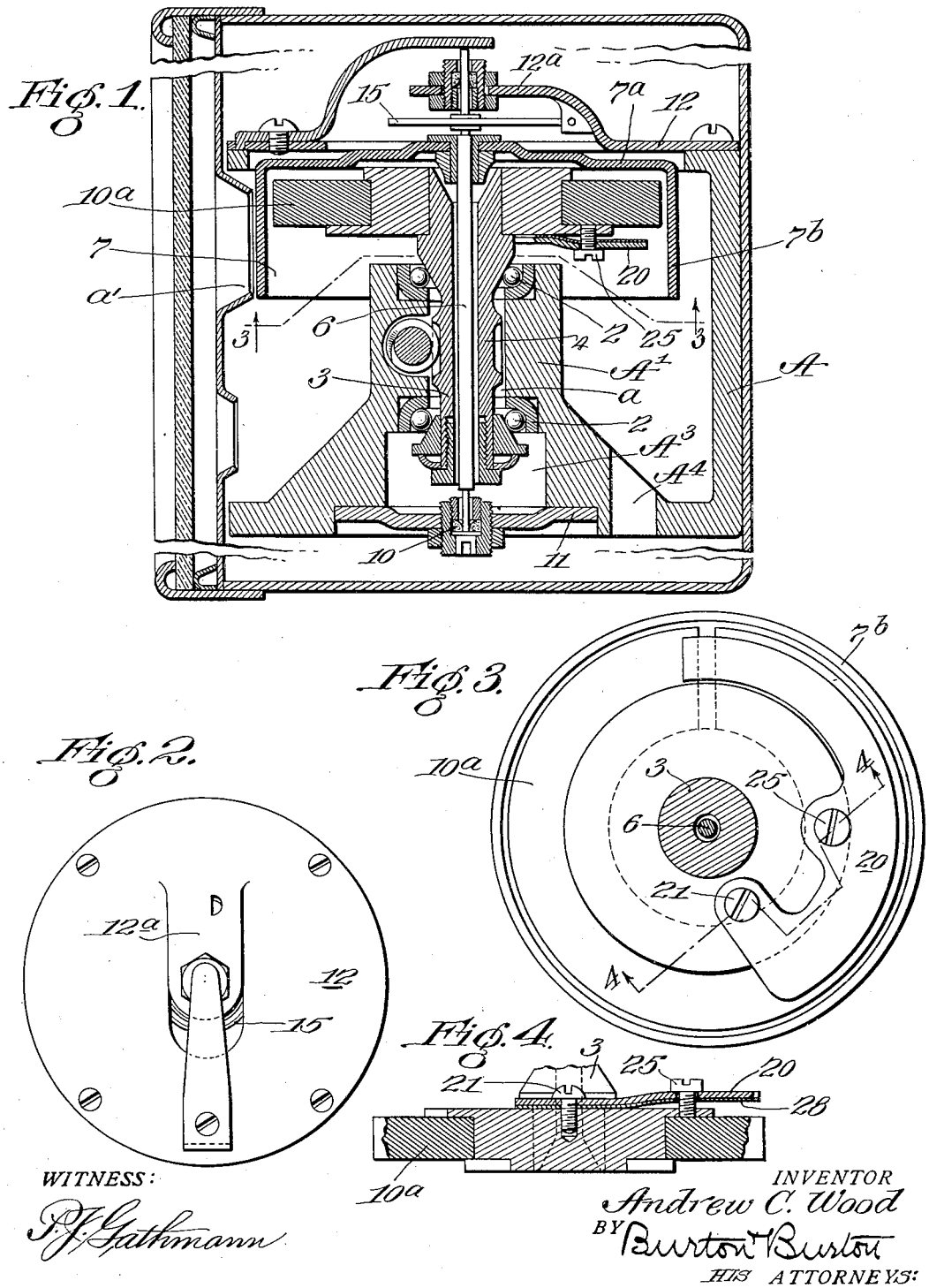

ANDREW C. WOOD, OF CHICAGO, ILLINOIS, ASSIGNOR TO STEWART-WARNER SPEEDOMETER CORPORATION, OF CHICAGO, ILLINOIS, A CORPORATION OF VIRGINIA.

MAGNETIC SPEEDOMETER.

1,396,081.   Specification of Letters Patent.   Patented Nov. 8, 1921.

Application filed October 16, 1920. Serial No. 417,450.

*To all whom it may concern:*

Be it known that I, ANDREW C. WOOD, a citizen of the United States, and a resident of the city of Chicago, in the county of Cook and the State of Illinois, have invented certain new and useful Improvements in Magnetic Speedometers, of which the following is a specification, reference being had to the accompanying drawings, forming a part thereof.

The purpose of this invention is to provide an improved construction of a magnetic speedometer, particularly with respect to compensation for temperature changes and means of calibration. It is a modification of a construction disclosed in my copending application, Serial No. 417,448, filed October 15, 1920. It consists in the elements and features of construction shown and described herein, as indicated in the claims.

In the drawings:

Figure 1 is a section through a portion of the case containing a speedometer embodying this invention, axial with respect to the magnet-carrying rotor and drag element.

Fig. 2 is a top plan view of the construction shown in Fig. 1.

Fig. 3 is a section at the line, 3—3, on Fig. 1.

Fig. 4 is a section at the line, 4—4, on Fig. 3.

The construction of speedometer shown in the drawings of this application, as to mounting and driving of the magnet, and as to mounting of the drag member is substantially similar to that shown in my said copending application, Serial No. 417,448, filed October 15, 1920, and will be only briefly described, since this general structure does not constitute any part of this application. The case, A, has an interiorly-extended mount, $A^1$; axially apertured, and having mounted in its axial aperture, $a$, two spaced-apart ball bearings, 2, 2, for the rotor shaft, 3, the axial aperture in the mount being counterbored forming a recess $A^3$, for admitting the ball bearing member at that end, and accommodating the compensating cone sleeve thereof. 4 is the rotor shaft journaled in said ball bearings, being axially hollow from end to end to accommodate the spindle, 6, of the drag member, 7, which obtains a step bearing at the rear end at 10, said bearing being mounted in a cover plate, 11, which closes the recess, $A^3$. The rotor carries rigidly the magnet, $10^a$, which is of the split ring type mounted with its axis coincident with the axis of rotation of the rotor. The upper closure plate, 12, of the casing which is of magnetic metal,—soft iron or steel,—is in general, situated in a plane parallel to the plane of rotation of the magnet, and is spaced therefrom only sufficiently for easy and safe clearance between it and the magnet of the drag member hereinafter mentioned; and said plate thereby serves as a field deflecting member for increasing the number of lines of magnetic force cut by the drag member. This upper closure plate or field deflector has a bracket arm, $12^a$, cut and sprung out from its substance to carry the upper bearing of the spindle, 6, and afford securement for the outer end of the biasing hair spring, 15, whose inner end is secured to said spindle, 6, of the drag member. Said drag member, 7, is in cup form, having its bottom or web, $7^a$, parallel to the plane of rotation of the magnet, and its flange or wall, $7^b$, encompassing the magnet and extended in width for a considerable distance beyond the plane of the inner space of the magnet to afford adequate area on its outer surface for the graduation markings of as large size as desirable, the casing being formed with a sight opening at $a^1$, for reading the speed indications therethrough. 20 is a field shunt member which is a bimetallic laminated part of which one metallic element is magnetic. It is in general in arcuate form, corresponding approximately to the path of rotation of the magnet. It has one end secured rigidly to the rotor by the screw, 21, the other end extended opposite the magnet gap with freedom of movement toward and from the magnet poles, such movement being resultant from change of temperature causing different rate of contraction and expansion of the two metallic elements of which the field deflector is composed, and consequent flexure of said member. Said member is resilient and is normally formed and mounted with its movable end when free positioned at a distance from the magnet poles determined to be a maximum distance desired for its function of shunting the magnetic field in opposition to the deflection thereof caused by the field deflecting member, 12; and provision is made for adjusting this shunt member by forcing it inward against its resiliency, to a greater or less extent to calibrate the instrument according to the strength of the magnet. For this purpose of calibration the screw, 25, is set through the spring deflector, 28, of the rotor, the head of the screw serving as a stop for the spring and the means for crowding it inward for the calibrating adjustment mentioned.

It will be understood that the effect of the shunt member, 20, is to diminish the magnetic field at the side of the magnet at which said field is cut by the web, 7a, of the drag cup, and that, therefore, the movement of the free end of said shunt member toward the magnet, causing it to deflect a greater number of the lines of force toward itself, decreasing the number of lines of magnetic force cut by the web of the drag member, tends to diminish the drag, and its movement in the opposite direction, away from the magnet, diminishing the number of lines of force which it deflects out of the plane of said web, increases the drag action of the magnet upon said drag member. Since the rise of temperature tends to diminish the drag action and the fall of temperature to increase it, it is necessary for the compensation which is the purpose of the temperature compensating action of the shunt member, that the free end of the latter should move toward the magnet poles upon the fall of temperature and away from said poles upon the rise of temperature; and it is therefore necessary that the metal element of said bimetallic shunt member having the higher coefficient of expansion should be on the side away from the magnet, and the element having the lower coefficients of expansion should be on the side toward the magnet. As stated, this element necessarily comprises a magnetic part, and this part being of steel is, in accordance with the foregoing reasons, at the side away from the magnet, the other element being of copper and of higher coefficient of expansion, being on the side toward the magnet. This relative position of the two metal elements of the deflector is a desirable one also for the reason that the copper element may be allowed to touch the magnet, whereas if the steel part were to touch it, it would be liable to be so strongly held by magnetic attraction as not to defeat the movement which it should have under change of temperature.

By having the shunt at the opposite side of the magnet from the web of the drag member, it is rendered possible to afford access to the screw, 20, which adjusts the said deflector toward and from the magnet for calibration, and this is accomplished by making a hole, A4, in the case positioned so that through it a screw driver may reach said screw for effecting said adjustment after the instrument is fully assembled.

I claim:—

1. In a magnetic speedometer, in combination with a casing, a rotor mounted therein; a magnet device mounted on the rotor for rotation in a plane containing all the magnet poles; a field shunt member secured at one end on the rotor and extending in arcuate form around the axis of the rotor and opposite the magnet gap at one side of the zone of rotation of the magnet; a drag member mounted and biased for oscillation about the axis of rotation of the motor in a plane at the opposite side of the magnet from the field deflector; said deflector being responsive to temperature changes to move its free end by flexure toward the magnet poles upon fall of temperature, and away from said poles upon rise of temperature.

2. In the construction defined in claim 1, foregoing, the field shunt member being a spring having its free end normally sprung away from the magnet pole; a stop screw set into the rotor for engaging said spring by its head to flex it in opposition to its resilient reaction toward the magnet pole for adjustment to calibrate the instrument, the case having an aperture in its rear wall through which the screw may be operated for such calibration when the instrument is completely assembled.

In testimony whereof, I have hereunto set my hand at Chicago, Illinois, this 11th day of September, 1920.

ANDREW C. WOOD.